United States Patent [19]
Rai

[11] Patent Number: 5,441,817
[45] Date of Patent: Aug. 15, 1995

[54] DIAMOND AND CBN CUTTING TOOLS

[75] Inventor: Ghanshyam Rai, Sandy, Utah

[73] Assignee: Smith International, Inc., Houston, Tex.

[21] Appl. No.: 145,365

[22] Filed: Oct. 29, 1993

Related U.S. Application Data

[63] Continuation of Ser. No. 964,672, Oct. 21, 1992, abandoned.

[51] Int. Cl.$^6$ .............................................. B22F 3/14
[52] U.S. Cl. .................... 428/551; 428/548; 428/552
[58] Field of Search ............... 428/408, 467, 472, 696, 428/336, 704, 551, 552, 548; 51/293; 350/381

[56] References Cited

U.S. PATENT DOCUMENTS

| | | | |
|---|---|---|---|
| Re. 32,380 | 3/1987 | Wentore et al. | 407/119 |
| 4,403,015 | 9/1983 | Nakai | 428/565 |
| 4,403,015 | 9/1983 | Nakai et al. | 428/565 |
| 4,411,672 | 10/1983 | Ishizuka | 51/309 |
| 4,440,573 | 4/1984 | Ishizuka | 75/243 |
| 4,474,434 | 10/1984 | Carlsen | 350/381 |
| 4,762,729 | 8/1988 | Hirano | 427/38 |
| 4,764,434 | 8/1988 | Aronsson et al. | 428/565 |
| 4,766,040 | 8/1988 | Hillert | 428/552 |
| 5,022,894 | 6/1991 | Vagarali | 51/293 |
| 5,022,894 | 6/1991 | Vagarali et al. | 51/295 |
| 5,326,380 | 7/1994 | Yao et al. | 51/293 |

Primary Examiner—Donald P. Walsh
Assistant Examiner—John N. Greaves
Attorney, Agent, or Firm—Robert G. Upton

[57] ABSTRACT

There is provided a method for making diamond and CBN composites, under HP/HT conditions, which comprises bonding a thin refractory material layer on the planar face of the tungsten carbide substrate proximate the diamond or CBN layer. There is also provided a small quantity of fine particles of yet another refractory material admixed in the diamond or CBN layer. The cooperation of these two systems greatly aid in regulating the flow of molten carbide bond metal from the substrate into the diamond or CBN layer, which minimizes abnormal grain growth and bond metal depletion at the diamond/substrate interface.

4 Claims, 4 Drawing Sheets

DIAMOND AND CBN CUTTING TOOLS

CROSS-REFERENCE TO RELATED APPLICATION

This application is a continuation of a patent application entitled IMPROVED DIAMOND AND CBN CUTTING TOOLS filed Oct. 21, 1992 Ser. No. 964,672, now abandoned.

BACKGROUND OF THE INVENTION

I. FIELD OF THE INVENTION

The present invention is directed to hard and abrasive cutting or drilling tools comprising a relatively thin polycrystalline diamond or cubic boron nitride (CBN) ruble having a substantially thicker cemented carbide substrate support.

More specifically, the present invention is directed to a method of manufacturing such tools which minimizes the depletion of tungsten carbide-cobalt eutectic from the sintered carbide substrate into the diamond or CBN table. Simultaneously a method of inhibiting undesirable diamond or CBN abnormal grain growth in the transition region of diamond or CBN to carbide bonding is incorporated in the high pressure/high temperature (HP/HT) sintering operation.

II. DESCRIPTION OF THE PRIOR ART

There are numerous prior art patents which describe the making of high pressure/high temperature (HP/HT) polycrystalline diamond or CBN tables with cemented tungsten carbide supports or substrates.

U.S. Pat. No. Re. 32,380 describes composite super abrasive tools comprising a polycrystalline diamond layer wherein substantially all of the diamond grains are bonded directly m adjacent grains and a typically cobalt bonded tungsten carbide substrate. This substrate is substantially larger in volume compared to the volume of the diamond layer. This patent also teaches that the cobalt in the cemented carbide substrate is made available in the HP/HT process as both a binder for the tungsten carbide and as a solvent/catalyst necessary for conversion of graphite to diamond. Although tools made according to the teaching of the above patent are suitable for some applications, the uncontrolled infiltration of cobalt from the WC/cobalt substrate into the diamond table leaves excessive cobalt between the diamond particles, which results in less than optimum abrasion resistance of the diamond layer. The physical and mechanical properties of the cemented carbide substrate at the diamond/carbide interface are also seriously reduced due to cobalt depletion from the carbide.

U.S. Pat. No. 4,411,672 describes a method to overcome the above problems by placing a thin metallic material having a melting temperature lower than the eutectic point of the tungsten carbide/cobalt composition between the diamond powder/carbide interface. The assembly is heated to the melting temperature of the metallic material, but lower than the melting temperature of the cobalt/tungsten carbide composition. This allows a somewhat controlled infiltration of the diamond particles with catalyst/solvent material without undue depletion of the cobalt from the carbide substrate. This method can also supply an excessive amount of cobalt to the diamond layer, thereby reducing its abrasion resistance.

Another means of controlling the amount of metallic infiltrant into the diamond layer is described in U.S. Pat. No. 4,440,573 in which a mass of diamond particles and a mass of infiltrant metal are separated by a higher melting point metallic barrier layer, whereby the infiltrant metal is regulated to flow around the barrier metal layer into the diamond particle layer under HP/HT conditions. Although this method does somewhat improve the flow of metal into the diamond table, abnormal diamond grain growth is still a problem. This condition creates a large mismatch of thermal expansion causing very high stresses with subsequent internal cracks in the sintered diamond or cubic boron nitride layer.

U.S. Pat. No. 5,022,894 teaches a method for making diamond and CBN compacts which comprise positioning a catalyst metal disc and a barrier metal disc intermediate a diamond or CBN and a carbide mass. The catalyst metal disc is adjacent to the diamond or CBN layer and the barrier disc is adjacent to and intermediate the catalyst disc and carbide mass under HP/HT conditions. This method provides regulated flow of metal bond from the carbide mass and helps to minimize depletion of metal bond in the carbide near the catalyst/diamond interface, but surplus catalyst metal in the diamond table can still be detrimental.

U.S. Pat. No. 4,474,434 teaches a method of regulating the flow of cobalt from the tungsten carbide substrate to the diamond or other super-hard material table, with the substrate bonding face having a non-planar or complex geometry. A thin (greater than three microns) continuous layer of refractory material (titanium nitride) is applied by PVD or CVD proximate the diamond/carbide interface. This thin coating of refractory material acts as a fairly effective cobalt/carbide eutectic diffusion barrier and reduces the depletion of cobalt in the carbide substrate. Relatively good control of the binder phase (Co, Ni, Fe) in the diamond/CBN layer is accomplished as one of these binder metal powders is added to the diamond powders prior to sintering, but abnormal tungsten and diamond crystal growth at the diamond/substrate interface remains a problem.

U.S. Pat. No. 4,403,015 teaches the making of a diamond or cubic boron nitride (CBN) composite compact by using an intermediate bonding powder layer between a carbide substrate and a hard diamond or CBN cutting layer. This intermediate layer being comprised of CBN powder admixed with powders of the borides, nitrides, carbides or carbonitrides of the 4a, 5a, 6a transition metals of the periodic table, or an admixture thereof. Diamond or CBN hard layers are positioned as powders proximate the pre-sintered tungsten carbide/cobalt substrate prior to being sintered under ultra high pressure, high temperature (HP/HT) conditions.

One disadvantage of this prior art system is that the intermediate bonding layer, being in a fine powder form, presents a high surface area which promotes their rapid solution with the cobalt/tungsten eutectic causing severe crystal growth and eutectic pooling at the carbide/diamond or cBN interface.

Another disadvantage of the prior art is it is very difficult to create a very thin uniform layer of powdered material as an intermediate bonding layer. This causes non-uniform residual stresses at the carbide/diamond or CBN interface. This often causes delamination of the diamond or CBN layer.

The present invention circumvents the aforesaid problems by providing a thin solid layer of titanium carbide (TiC) bonded to the carbide substrate surface prior to HP/HT sintering. This thin continuous solid layer has a very low surface area compared to powdered TiC, therefore it does not readily go into solution with the cobalt eutectic. This results in a much lower level of grain growth and eutectic pooling, thereby practically eliminating diamond or CBN layer exfoliation.

The present invention also has an advantage over the prior art in that the lower and more uniform residual stresses provided by the solid thin and very uniform layer of TiC bonded to the carbide substrate materially reduces diamond layer delamination.

SUMMARY OF THE INVENTION

It is one object of the present invention to provide a method for making very fine to medium grained polycrystalline diamond or cubic boron nitride (CBN) sintered bodies bonded to a cermet substrate that do not have abnormal diamond/CBN grain growth that would seriously weaken the abrasive layer.

It is another object of the present invention to provide a method for making polycrystalline diamond or CBN sintered bodies bonded to a cermet substrate which substantially controls the migration of WC—Co alloy from the planar cermet substrate into the diamond or CBN table. This prevents or minimizes the embrittlement of the cermet at the diamond, CBN/cermet interface.

The above objects are complimentary and synergistic in that each method by itself improves somewhat on the inadequacies of prior art, but combined, the two methods improve the physical and mechanical properties of the sintered body significantly.

In accordance with the foregoing objects, there are provided polycrystalline diamond/CBN sintered bodies having cemented carbide/cobalt planar supports or substrates, wherein a small amount of titanium carbonitride [(Ti(CN)] is admixed with the diamond/CBN powder prior to the high pressure/high temperature (HP/HT) process.

Concurrently, the cemented carbide/cobalt planar surface which is in intimate contact with the diamond/CBN powder mass, during sintering, has been provided a continuous or solid monolithic thin layer of titanium carbide (TiC) which preferably has a thickness greater than seven microns. The thin solid layer of TiC is applied by chemical vapor deposition (CVD) or physical vapor deposition (PVD).

BRIEF DESCRIPTION OF THE DRAWINGS AND PHOTOGRAPHS

DETAILED DESCRIPTION OF THE INVENTION

Figure 1:
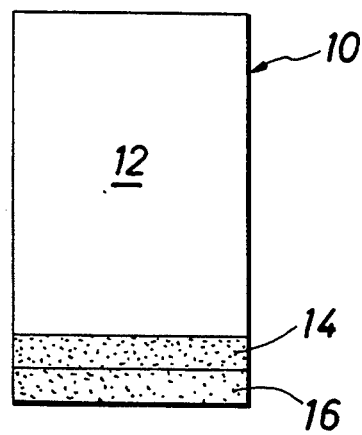
FIG. 1 is a diagrammatic illustration of the prior art method of forming diamond on a cermet substrate.

The prior art diagram shown in FIG. 1 depicts the teachings of the '015 reference. A diamond compact generally designated as 10 consists of a tungsten carbide substrate (cermet) body 12 that provides a base for a layer 14 consisting of powdered CBN admixed with powders of the borides, nitrides, carbides or carbonitrides of the 4a, 5a, 6a transition metals of the periodic table. Six examples are disclosed all of which contain CBN admixed with one or more of the above elements. Since the intermediate layer 14 consists of fine powders, the surface area is very large as heretofore described. This promotes a rapid solution with the cobalt/tungsten eutectic which causes severe crystal growth and eutectic pooling at the carbide/diamond interface.

Figure 2:
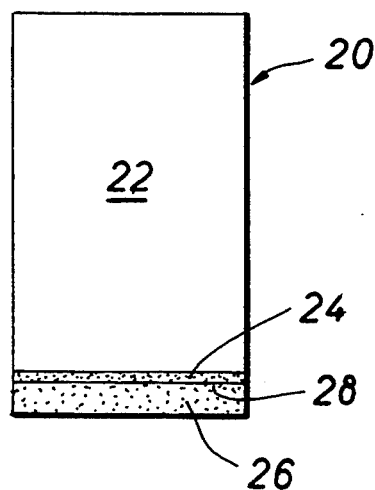
FIG. 2 is a diagrammatic illustration of the present method of forming diamond or CBN material on a cermet substrate.

The diagram of FIG. 2 represents the present invention wherein a diamond or CBN compact generally designated as 20 consists of a tungsten carbide substrate (cermet) 22 that provides a base for a thin solid monolithic diffusion layer 24 consisting of titanium carbide (TIC) bonded to the substrate 22 through the application of physical vapor deposition or chemical vapor deposition techniques. The solid thin layer of TiC has significantly less surface area than finely powdered TiC thus, it has a much slower rate of solution in the cobalt eutectic which allows for temperature equilibrium in the entire diamond/substrate interface 24 prior to the cobalt-tungsten-titanium invasion of the diamond (or CBN) layer 26. This solid diffusion layer 24 reduces abnormal tungsten-diamond grain growth and the formation of cobalt eutectic "lakes" and "rivers".

Moreover, the rate of solution of diamond in the in the cobalt eutectic is slow enough to measurably reduce abnormal grain growth at the diamond/substrate interface 24.

Additionally, the solid TiC layer 24 is significantly more uniform than a powdered layer, thus it forms a bond line 28 between the diffusion layer 24 and the diamond layer 26 with much lower and more uniform residual stresses.

The diamond layer preferably contains fine powdered titanium carbonitride [Ti(CN)] admixed in with the diamond powder of layer 26. The Ti(CN) further increases the contact angle and surface tension of the invading cobalt eutectic thereby reducing undesirable diamond grain growth and the formation of cobalt lakes and rivers which otherwise would seriously weaken the diamond layer 26.

The novel use of the solid TiC diffusion layer 24 bonded on the carbide substrate and the powdered Ti(CN) in the diamond powder layer 26 each significantly improve the physical and chemical structure of the diamond table and the bond to the carbide substrate, but when they are utilized coincidently, they are synergistic and greatly improve the entire composite or compact 20.

Figure 3:
FIG. 3 is a photomicrograph of prior art showing an eruption of WC—Co at the interface of the diamond layer and cobalt cemented carbide substrate.
Figure 4:
FIG. 4 is another photomicrograph of prior art illustrating abnormal tungsten carbide crystal growth at the interface of the diamond layer and WC substrate.

According to one aspect of the invention, there is provided a composite body comprising a volume of sintered polycrystalline diamond or cubic boron nitride (CBN) bonded to a cemented carbide or other cermet support or substrate made under high pressure/high temperature (HP/HT) conditions. The planar surface of the carbide-cobalt substrate proximate the diamond or CBN powder mass is preferably coated with a thin (6–10 microns) continuous layer of titanium carbide (TiC). Theoretically, it can be assumed that other titanium compounds, such as titanium nitride or nitrides, borides and/or carbides of elements of Groups IVa, Va and/or VIa of the periodic system, may be used for the above described coating. These solid monolithic coatings are advantageously applied to the tungsten carbide substrate using chemical vapor deposition (CVD) or physical vapor deposition (PVD) processes. The described thin solid layer functions as a diffusion barrier/regulator of the molten cobalt-tungsten eutectic from the cobalt cemented tungsten carbide substrate into the diamond or CBN powder mass. In the HP/HT sintering process, the diamond/CBN and substrate assembly is heated radially from the outer periphery inward. The outer margin attains the molten condition more rapidly than the central region, therefore, when no diffusion barrier is utilized, preferential sintering of the diamond/CBN takes place. Poor diamond/cemented carbide interface strengths are often produced. This is clearly shown in FIG. 3 where a large pool of the molten tungsten carbide-cobalt alloy has erupted into the diamond layer. Abnormal grain growth is very evident. FIG. 4 clearly shows abnormal lengthening of the carbide grains with little or no transition bonding taking place.

Figure 5:
FIG. 5 is a prior art photomicrograph of a river of cobalt-tungsten eutectic vertically piercing the diamond table with abnormal diamond crystal growth along the river edges.
Figure 6:
FIG. 6 is a prior art photomicrograph. It displays a river of cobalt-tungsten vertically piercing the diamond table with abnormal large tungsten strands precipitated therein.

The thin solid layer of TiC, TiN or other titanium compounds dissolve very slowly in the cobalt rich molten eutectic. This retards preferential infiltration of the diamond layer until temperature equilibrium has been achieved. The retarding of infiltration is due to the alloying of the Co—W liquid with titanium which significantly alters the surface properties of the molten metal. The contact angle of the molten metal increases from 5-8 degrees to about 25 degrees and the surface tension is increased proportionally. This significantly decreases its ability to wet the diamond particle surfaces. This phenomenon is especially important when sintering fine to medium fine size diamond particles when selective diamond grain coarsening is a serious problem. The surface area of finer diamond crystals is very large therefore, they are very prone to dissolve in the molten metal and then re-precipitate on larger diamond particles, which grow abnormally to create a serious defect. This is shown clearly in FIG. 5 where abnormal diamond crystal growth has occurred along and in a metal river that emanates from the diamond/tungsten carbide interface through the diamond layer surface. FIG. 6 also shows abnormal diamond crystal and tungsten strand growth in a similar metal river. Both conditions described above have very weak bond strength at the diamond/substrate interface and the diamond layer frequently delaminates.

According to another aspect of the invention incorporating a small amount (1.0%–8.0% by weight) of fine (5 microns or less) titanium carbonitride [Ti(CN)] is admixed with the diamond/CBN powder mass prior to processing under HP/HT conditions. The titanium carbonitride Ti(CN) inhibits abnormal diamond/CBN grain growth by further alloying with the infiltrated cobalt-tungsten eutectic, increasing the molten metal surface contact angle greater than threefold. This also proportionally increases the surface tension as related to the wetability of the fine diamond particles by the molten Co—W—Ti alloy. This change in molten metal surface properties reduces the ability of the metal to dissolve the diamond/CBN and re-precipitate onto larger undisolved crystals to form weak abnormal grain sizes in the abrasive layer and at the substrate interface.

Although a thin titanium carbide layer on the tungsten carbide substrate alone does somewhat reduce preferential infiltration of the abrasive layer and admixing titanium carbonitride with the diamond/CBN particle mass alone does somewhat reduce abnormal grain growth in the abrasive layer and at the substrate interface, when both a diffusion barrier, such as a thin titanium carbide layer on the tungsten carbide substrate, is used in conjunction with the admixing of fine titanium carbonitride in the diamond/CBN layer the two systems are synergistic and the physical/metallurgical properties of the sintered composite body are greatly enhanced. Abnormal grain growth in the abrasive layer and at the carbide substrate interface is practically eliminated. Abnormal tungsten and tungsten carbide formation and eruption through the diamond layer is also reduced to a negligible amount. This is evident in FIG. 5 which shows normal grain distribution on both sides of the titanium carbide diffusion barrier with no eruptions or metal rivers being formed.

Figure 7:
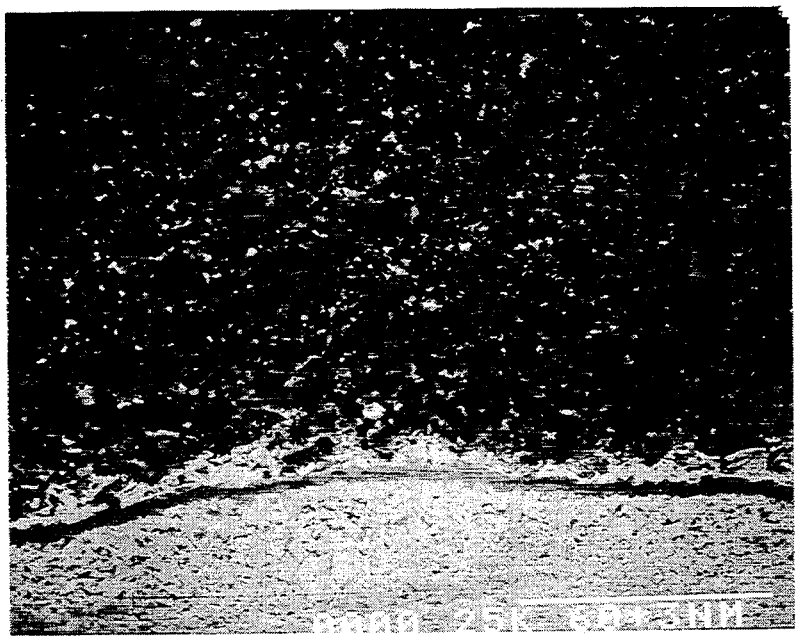
FIG. 7 is a photomicrograph of the present invention. Shown is a thin titanium carbide (TIC) coating on the WC—Co substrate and a gradient of normal diamond and WC crystal growth at the interface.
Figure 8:
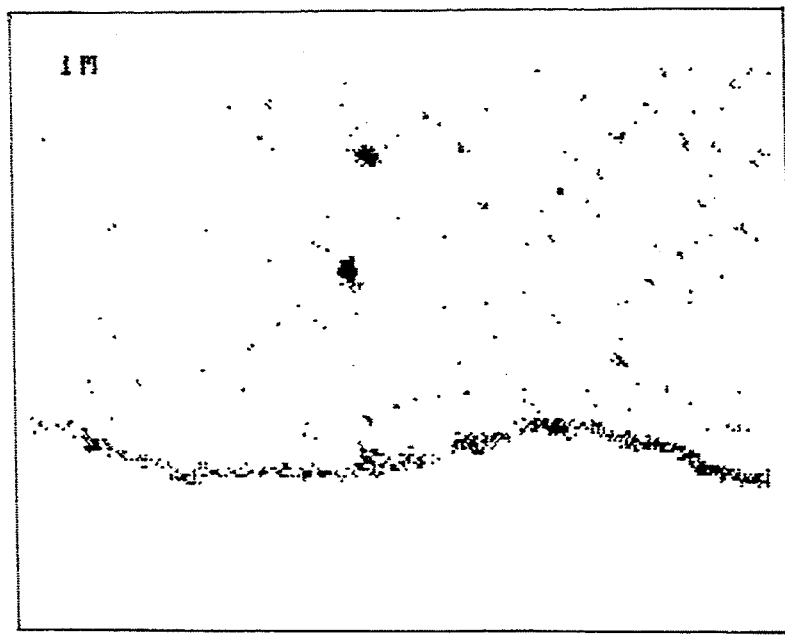
FIG. 8 is an X-ray map of titanium contained in the structure shown in FIG. 7. It shows the TiC layer on the Wc/Co substrate and the TiCN dispersed in the diamond layer.

FIG. 8 is an X-ray map of titanium that corresponds to FIG. 7. This map shows the titanium concentration in the titanium carbide diffusion barrier at the interface of the diamond layer and the carbide substrate. Also depicted, in the upper portion of the map, is the dispersed titanium carbonitride in the diamond layer.

It will of course be realized that various modifications can be made in materials and methods in the present invention without departing from the spirit thereof. Thus, while the preferred construction and materials for the manufacture of the invention has been explained in what is now considered to represent its best embodiments, which have been illustrated and described, it should be understood that within the scope of the appended claims, the invention may be practiced otherwise than as specifically illustrated and described.

I claim:

1. A sintered polycrystalline diamond composite comprising:

a mass of fine diamond particles bonded to a cermet substrate support having a planar face;

said cermet is cobalt cemented tungsten carbide, said cermet support having proximate the diamond mass, an intermediate thin solid monolithic diffusion barrier layer of titanium carbide material, said material being from about 7 microns to 10 microns thick applied to said planar face by physical vapor deposition or chemical vapor deposition processes; and a small quantity from about 1.0% to 8.0% of fine titanium carbonitride powder admixed in the diamond particles, said diffusion barrier of titanium carbide material serves to inhibit the flow of a cobalt tungsten eutectic from said cermet substrate into the mass of diamond in the form of tungsten carbide eruptions into the diamond mass which is detrimental to the sintered polycrystalline diamond composite.

2. A method of making polycrystalline diamond composites comprising the step of:

bonding a mass of fine diamond particles to a cobalt cemented tungsten carbide planar substrate under high pressure/high temperature conditions;

alloying a titanium carbonitride powder admixed in the diamond particle layer under high pressure/high temperature conditions, and further alloying a cobalt-tungsten alloy from the cemented tungsten carbide substrate with some of a titanium carbide diffusion regulating layer on the substrate under high pressure/high temperature conditions thereby forming a solid monolithic diffusion layer on said substrate, said titanium carbide diffusion layer serves to inhibit tungsten carbide eruptions into the diamond mass which is detrimental to the polycrystalline diamond composite.

3. A sintered cubic boron nitride composite comprising:

a mass of fine cubic boron nitride particles bonded to a cermet substrate support having a planar face;

said cermet support is cobalt cemented tungsten carbide, said cermet having proximate the cubic boron nitride mass an intermediate thin solid monolithic diffusion barrier layer of titanium carbide regulating material from about 7 microns to 10 microns thick applied to said planar face by physical vapor deposition or chemical vapor deposition processes; and a small quantity from about 1.0% to 8.0% of fine titanium carbonitride powder admixed in the cubic boron nitride particles, said diffusion barrier of titanium carbide material serves to inhibit the flow of a cobalt tungsten eutectic from said cermet substrate into the mass of cubic boron nitride particles.

4. A method of making cubic boron nitride composites comprising the steps of:

bonding a mass of fine cubic boron nitride particles to a cobalt cemented tungsten carbide planar substrate under high pressure/high temperature conditions;

alloying a titanium carbonitride powder admixed in the cubic boron nitride particle layer under high pressure/high temperature conditions, and further alloying a cobalt-tungsten alloy from the cemented tungsten carbide substrate with some of a titanium carbide diffusion regulating layer on the substrate under high pressure/high temperature conditions thereby forming a solid monolithic diffusion layer on said substrate, the titanium carbide diffusion regulating layer serves to inhibit tungsten carbide eruptions into the polycrystalline diamond composite.

* * * * *